Nov. 17, 1936.　　　H. O. SMITH　　　2,060,831
SIGNALING DEVICE FOR MOTOR VEHICLES
Filed Nov. 3, 1932　　　5 Sheets-Sheet 2
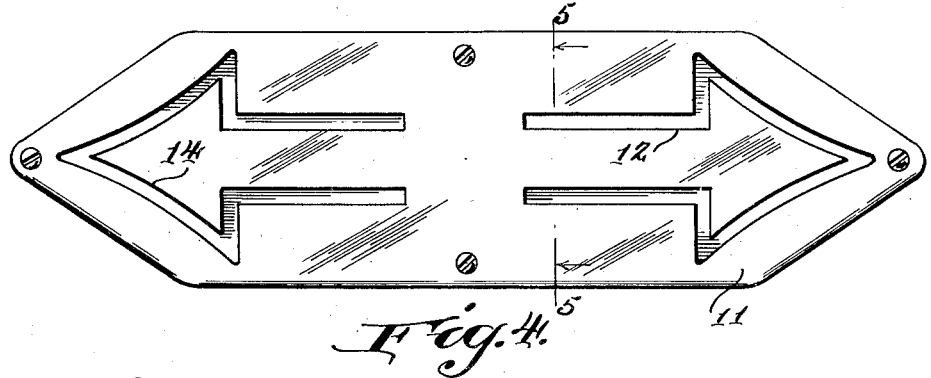
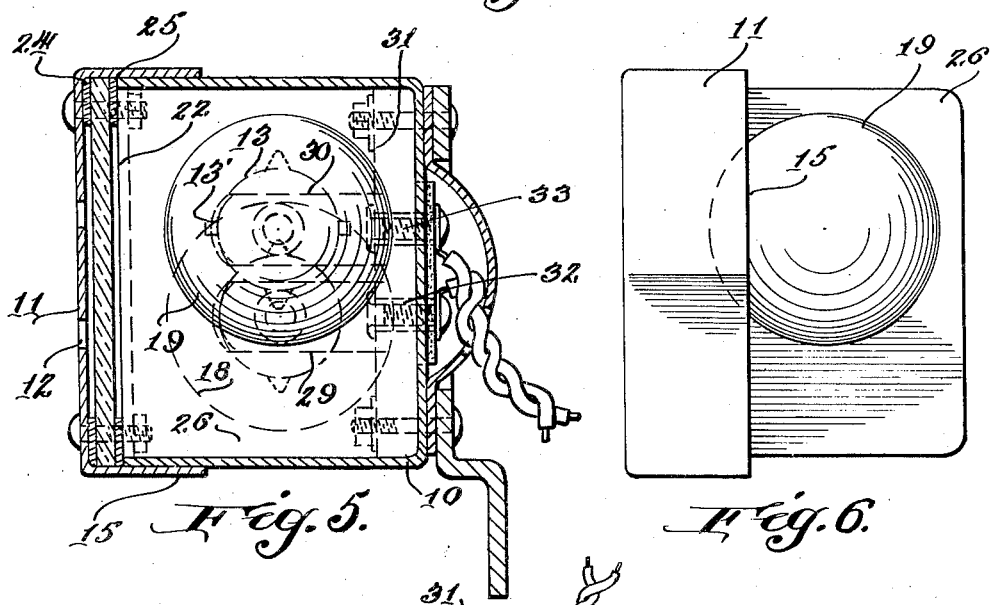
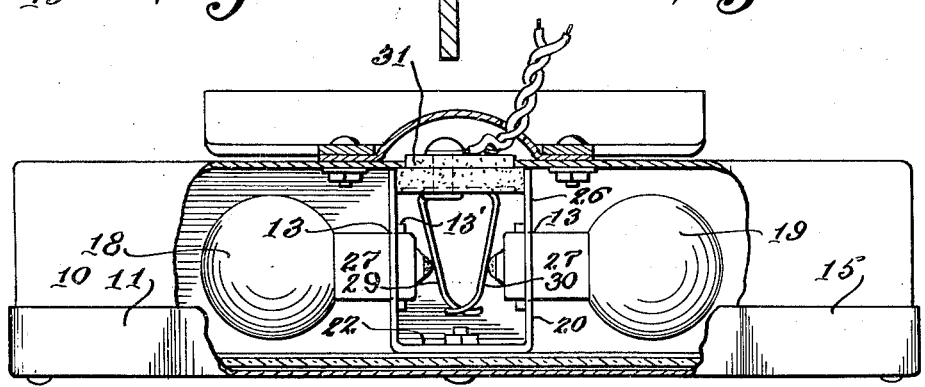

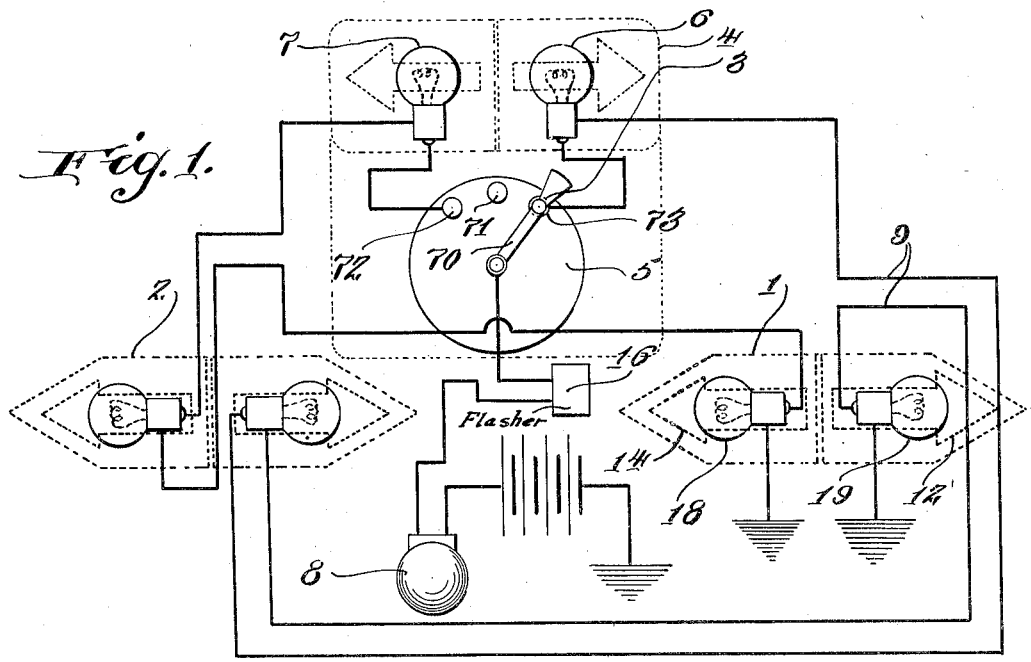
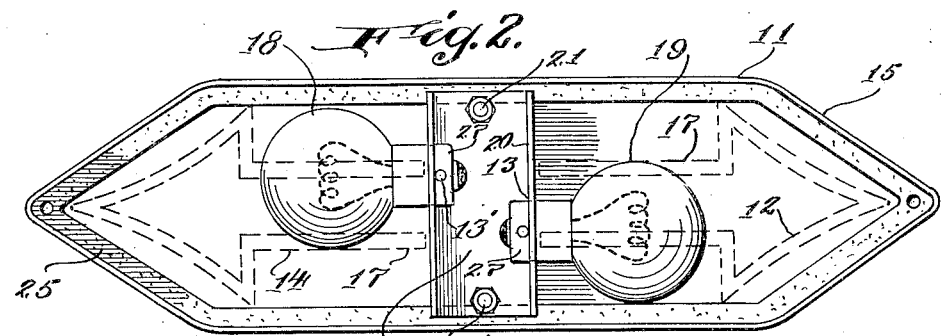
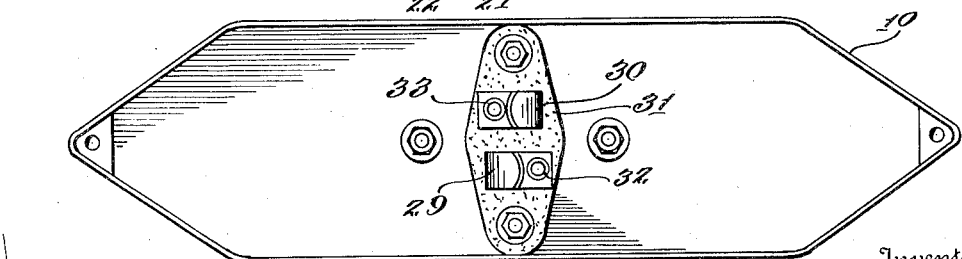

Nov. 17, 1936.  H. O. SMITH  2,060,831

SIGNALING DEVICE FOR MOTOR VEHICLES

Filed Nov. 3, 1932   5 Sheets-Sheet 3

Harold O. Smith, Inventor

By Edwin Samuels, Attorney

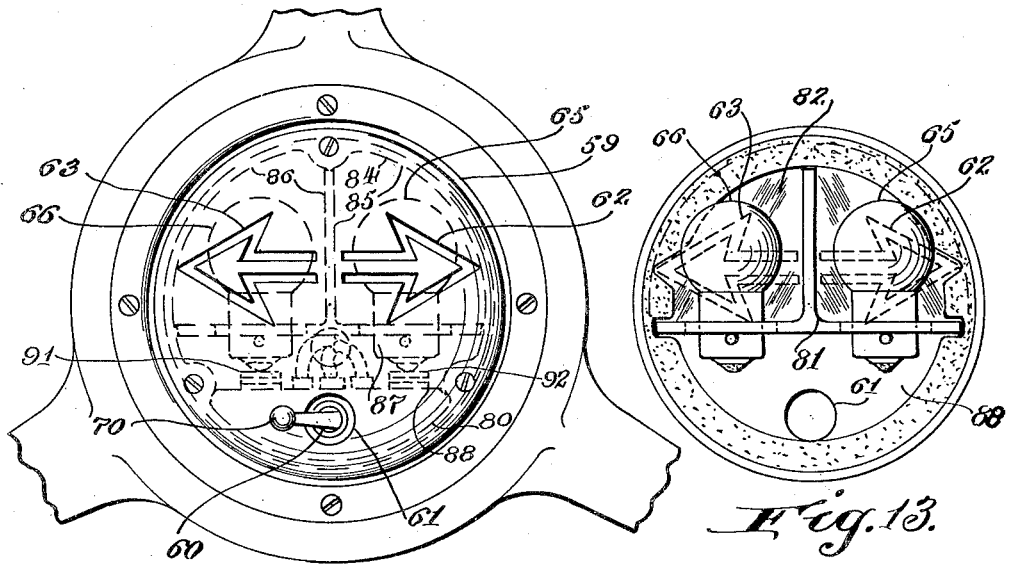
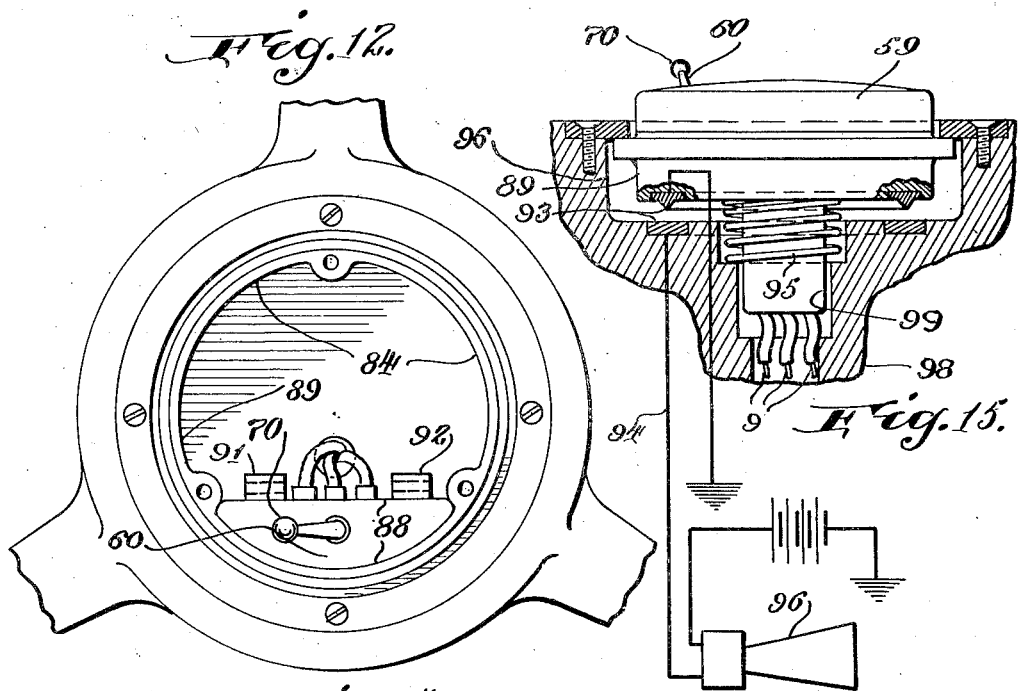

Nov. 17, 1936.    H. O. SMITH    2,060,831
SIGNALING DEVICE FOR MOTOR VEHICLES
Filed Nov. 3, 1932    5 Sheets—Sheet 5
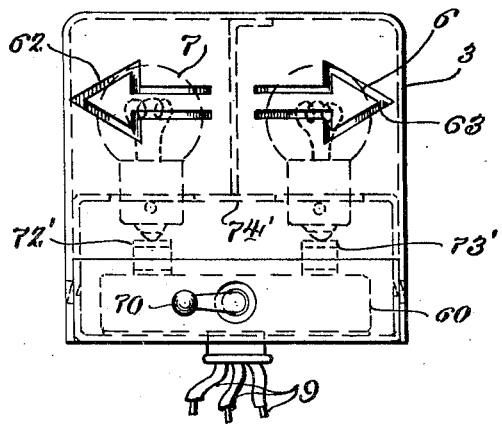
Fig. 16.
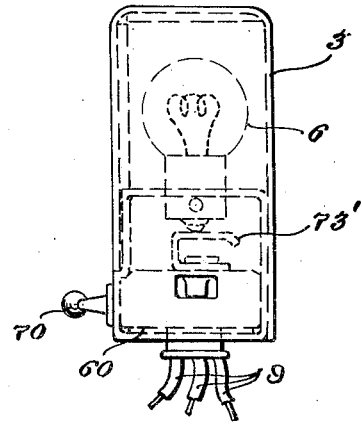
Fig. 17.
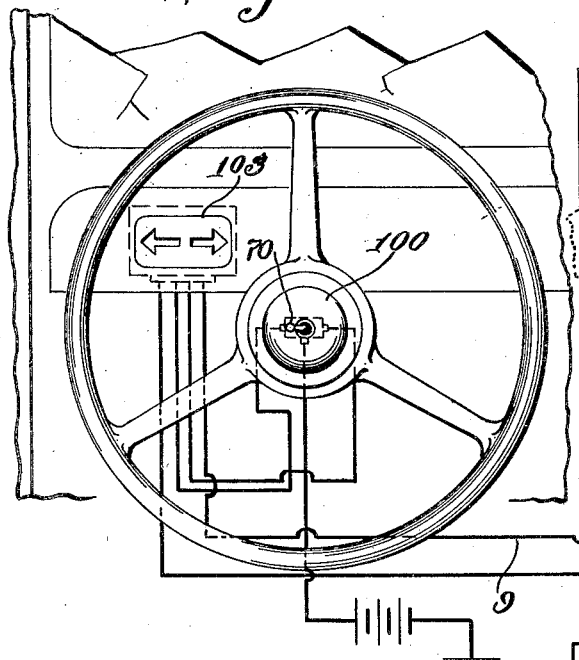
Fig. 18.
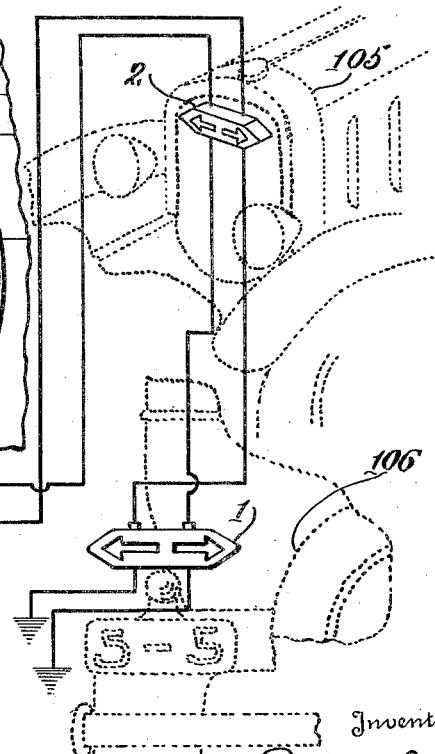
Inventor
Harold O. Smith
By Edwin Samuels
Attorney Patented Nov. 17, 1936

2,060,831

UNITED STATES PATENT OFFICE 2,060,831

SIGNALING DEVICE FOR MOTOR VEHICLES

Harold O. Smith, Indianapolis, Ind., assignor to Turnsignal Corporation, Philadelphia, Pa., a corporation of New Jersey Application November 3, 1932, Serial No. 640,969

4 Claims. (Cl. 177—339)

The invention relates to a selectively illuminated signaling system for motor vehicles for use in indicating the intent of the driver to turn the vehicle to the right or to the left, as the case may be.

The invention also contemplates the combination of this system with other signaling means. The improved signaling apparatus of the invention in the preferred form includes selectively illuminated direction pointers and a sounding device for drawing the attention of pedestrians, traffic officers and drivers of other vehicles at intersections, to the driver's intention to turn in the direction indicated.

The invention also comprises the details of the system as the light box with the means for illuminating it, and the control switch, the control and control indicator box and the form and arrangement and manner of mounting the same.

The illuminated signals, to avoid blurring, are preferably produced in outline by slotting or perforating the light box, usually the box cover.

The direction signals are most conveniently in the form of arrows, pointing to the right and left, respectively, and in operation these signals are illuminated separately and selectively by the driver in accordance with the direction of the turn to be made.

The preferred embodiment of the invention may also include a sounding device arranged to be operated simultaneously with the illumination of the signal or pointer to eliminate any chance that it may be overlooked. This also serves to call the attention of the driver to the fact that the signal is illuminated so that the light will be promptly extinguished. The sounding device may be in the form of a buzzer or bell or other sound signal, preferably differing from the horn, and located in or in the vicinity of either signal, or the horn itself may in some instances be utilized for this purpose.

The invention also contemplates the combination with the signal of a winker or blinking device causing the light to be interrupted at intervals, further contributing to the ability of the device to attract the attention of traffic officers, pedestrians and approaching motorists. Certain details of construction, while capable of variation, are regarded as of importance as the mounting of the light bulbs which illuminate the pointers on the front cover of the signal light box so that they are removed with the cover which carries the glass. Suitable binding posts with metal contacts for the light terminals may also be mounted in the box making all the connections and the bulbs easy of access and replacement. Also, the partition which divides the box in correspondence with the pointers may be used both as a support for the bulbs and as a means for securing the glass to the cover.

Other features of the invention consist in the provision of indicator lights in the circuit with the respective bulbs which light each arrow, so that the driver is always advised as to whether his signal lights are in operation. This feature is of particular importance in its effectiveness in avoiding the oversight of leaving one or the other of the signals illuminated after the turn has been made. The sounding device also contributes to this result. The indicator lights may be mounted either in the control or switch box or on the instrument board.

An important feature of the apparatus consists in the use of the horn button as a carrier or enclosure for the control including in the preferred form both the indicator lights and switch. This arrangement is of particular advantage as it enables the driver to sound the horn and operate the direction signals simultaneously so that the horn may be used to call attention to the signals or either can be operated separately. Also, the switch thus located is easily and quickly reached and operated, and the indicator showing the condition of the signal lights is directly in the line of the driver's vision. In this way, any chance that the signal may be left on and forgotten is avoided.

For this purpose the horn button may be constructed with a hollow top portion which may, if desired, be extended laterally to provide sufficient room for the control mechanism. The indicator lights may be either included in the control mechanism which is mounted in the button or elsewhere, or they may be placed in the instrument board or omitted at the discretion of the manufacturer.

The inclusion of the control casing as a part of the horn button is regarded as contributing to the convenience of operation, though this casing or box may be otherwise mounted near the center of the steering wheel, or placed on the dash at the discretion of the manufacturer.

It will be understood that while the signaling device is of importance in its application to the rear of the vehicle so that drivers of following vehicles can be advised of the intent of the operator to turn to the right or left, it is of still greater importance in its application to the front of the vehicle in advising pedestrians and traffic officers, as well as drivers of vehicles approaching in other directions, at crossings and intersections, of the intent of the driver of the vehicle thus equipped to turn to the left or right from his normal course. In passing through a line of pedestrian traffic, the sounding device is of great assistance in drawing the attention both of pedestrians and traffic officers to the driver's desire or intent to turn, and the close relation of the signal control switch to the horn button providing for simultaneous operation of both is of the greatest assistance where additional emphasis is required. At crowded intersections and particularly at night the front signal is of greatest assistance in enabling the traffic officer to arrange and control the flow of traffic.

It is of particular interest that the system includes in addition to a sounding device and a switch for selectively illuminating the oppositely disposed direction indicators, a periodically operating automatic circuit interrupting device, the direction signal lights, the sounding device and the interrupter being in the same circuit so that the sound and the lights are controlled and operated and interrupted simultaneously and in conjunction with each other. This arrangement is of great advantage in calling the attention of the traffic officer and the pedestrian at street crossings and in heavy traffic to the fact that the direction signal is on and that a turn in a specified and indicated direction is contemplated. This enables the pedestrian, as well as the vehicular traffic, to act accordingly and where the right to turn is in doubt, gives the officer an opportunity to indicate his decision as to whether and when such a turn may be permitted.

In the accompanying drawings I have illustrated the motor vehicle signaling apparatus of the invention with various changes and modifications which are regarded as of interest.

In the drawings:

Figure 1 is a diagram view showing the signaling device at the front and rear with a control switch and indicator lights.

Figure 2 is an elevation of the front or rear signal box cover looking at the same from the inside of the box, the signal being of the type shown in Figure 1.

Figure 3 is an elevation of the box with the cover removed looking at the inside of the box.

Figure 4 is an elevation of the signal box looking at the same from the front or rear with all parts assembled.

Figure 5 is a section on the line 5, 5 in Figure 4.

Figure 6 is an end elevation looking from the right in Figure 4.

Figure 7 is a top plan view of the box with a portion of the top wall of the box, the cover flange removed to disclose the elements contained within the box.

Figure 12 is a plan view of the controller casing formed in the horn button located at the center of the wall.

Figure 13 is an inside view of the cover of the control casing otherwise defined as a view of the cover removed inverted containing the partition and light bulbs in accordance with the preferred form of this device.

Figure 14 shows the control box formed in the horn button as in Figure 12, the cover with the partition and light bulbs being removed.

Figure 15 is an elevation of the horn button containing the controller box, the steering wheel and column being sectioned fragmentarily to illustrate its position therein.

Figure 16 is a front elevation of the control box adapted to be mounted on the dash and in any other convenient position.

Figure 17 is a side view of the same.

Figure 18 is a plan view of the wheel with the horn button used as a mounting for the signal switch. It also shows the indicator pointers on the dash and includes a diagrammatic illustration of the circuit which is considered best adapted for this purpose with the signal box at the front and rear, portions of a motor vehicle being indicated in connection therewith.

Figure 8:
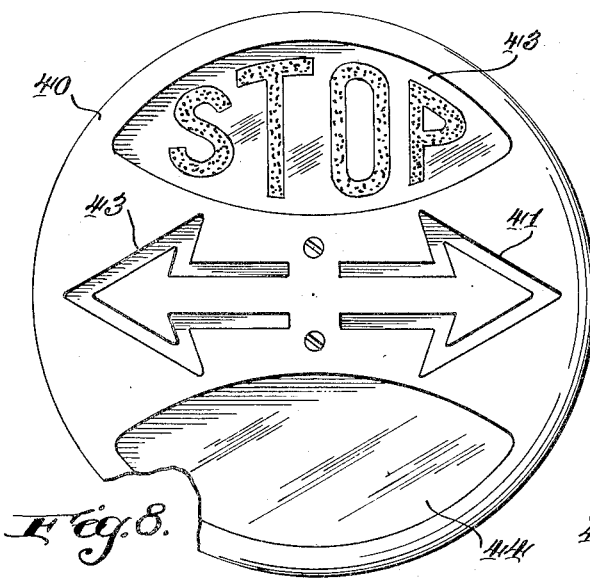
Figure 8 is an elevation corresponding to Figure 4 of a rear signal box assembled. This view shows the modified form including the stop and tail light in combination with the direction signal.
Figure 9:
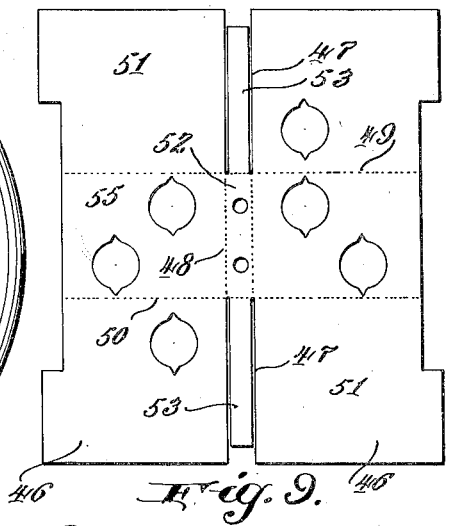
Figure 9 is a development of the partition which may be also considered as a plan of the blank from which the partition is made.

Referring to the drawings by numerals, each of which is used to indicate the same or similar parts in the different figures, and having particular reference to Figure 1, showing the signaling system diagrammatically, the system as shown in the preferred form includes a signal light casing 1 at the rear and it also includes a second signal light casing 2 to be exposed at the front of the vehicle for the benefit of drivers approaching in the opposite direction. The illustration, Figure 1, also includes a control 3 which may be enclosed in a casing which in the diagrammatic view, is indicated at 4. This control 3 includes a switch 5 and the indicator lights 6 and 7, which may be either enclosed within the controller casing 4 or mounted on the instrument board which is enclosed in the dash in accordance with the usual practice to control circuit 9.

In the preferred form the system may also include a sounding device indicated at 8. This may be of a different type from the customary horn, being for the specific purpose of attracting attention to the signal so that it may not be by any chance overlooked and disregarded, or the fact that it is illuminated forgotten by the driver. It is as hereinafter described included in the circuit to be operated simultaneously with the signal lights.

Referring more particularly to the details of the construction illustrated, the signal light casing 1 at the rear and 2 at the front would, under ordinary circumstances, be similarly constructed and equipped though the rear casing may, if desired, include the tail light and the stop light as hereinafter more fully described and the front casing may be made to include illuminating means, in addition to the signal lights, desired.

In the form shown the casing 1 encloses a direction signaling unit which is identical with the signaling unit contained in the casing 2 at the front so that but one will be described. This, as shown in Figures 2 to 7, consists of an elongated box 10 which may be pointed at the ends as shown to adapt the same, or more particularly to adapt the front or front cover 11 to the pointers or arrows 12 and 14.

In the preferred form of the invention the front cover 11 is slotted to produce the outline of two arrows indicated at 12 and 14, which are oppositely disposed and the cover is flanged at 15 to enclose a glass which may be red or other conspicuous color. This glass is most conveniently formed to fit the cover which is flanged to enclose the open side of the box, though it is essential only that it should cover the slots 17 which form the outlines of the arrows or other pointers 12 and 14. It is an essential feature of the invention that the arrows be so spaced apart that the casing can be divided into two chambers, one being directly in registration with each respective arrow 12 and 14, the sections or chambers being separated from each other by light tight partitions and each containing a source of illumination shown in the form of bulbs 18 and 19, the circuit being so arranged that these bulbs can be separately and selectively lighted at the will of the operator whereby the corresponding arrow or pointer 12 or 14 is illuminated indicating the direction in which the driver of the vehicle is about to turn it.

To separate the lights 18, 19 to provide for separate illumination of the pointers 12 and 14, in the form of the invention shown a partition member 20 has been provided which is secured to the front cover 11 by means of screws, screw bolts or other suitable fastening as rivets or the like indicated at 21. This partition in the preferred form consists of a U shaped piece of metal. The cross arm of the U indicated at 22, lies in a plane parallel to the plane of the cover 11 and overlies the glass, being most conveniently utilized as a means for holding the glass in position. To avoid breaking the glass and also to avoid leakage of dust and water into the casing, a suitable packing is provided at 24 between the glass and the cover and at 25 between the cross arm 22 and the glass. The partition 26 proper which separates the chambers which underlie the respective arrows 12 and 13, are formed by the legs of the U shaped metal plate referred to as member 20. These legs 26 of the U shaped plate, also referred to as the partition proper, are most conveniently utilized as a support for the light bulbs 18 and 19, the plates being most conveniently apertured at 13 to receive the shanks 27 of the bulbs which in accordance with the well known practice are provided with pins 13' which pass through notches in these openings and on rotation of the bulbs serve to secure them in position.

A most convenient form of electrical connection for the lights is shown in the form of the spring plates 29 and 30, secured to a block 31 of any suitable insulating material, the most convenient material being a phenolic condensation product which is seated in the back of the box 10. These spring plates are so disposed that on application of the cover containing the bulbs they pass between the contact points of the bulbs, being sprung inwardly thereby forming a most satisfactory contact. The block 31 is provided with suitable terminals 32 and 33 secured to the block to which terminals the lighting circuit is connected.

As a further means for attracting the attention of drivers of approaching vehicles, a blinker plug 16 of well known construction may be inserted in the circuit.

An important advantage in the details of the construction resides in the simple and cheap arrangement whereby the U shaped partition member 20 is utilized to hold the glass, and particularly whereby it is made available to support the light bulbs so that these can be removed with the cover 11 making it extremely easy to replace the bulbs and also to scrape and correct the contacts in case of failure of the circuit. This partition in the preferred form serves as a clamp for the packing which may be located on both sides of the glass as well as for the glass itself.

Figures 8 to 11 illustrate an alternative form of rear light box or casing 40, which includes not only the right and left turn pointers 41 and 43, preferably formed in outline consisting of slots or perforations as shown, but also includes the stop light portion 43 and tail light portion 44.

For this purpose a partition member has been devised which like the partition member 20 is adapted to be made of a single piece of metal by a simple stamping operation which is a distinct advantage from the standpoint of economy and adaptability to mass production. The partition member shown in this instance indicated by reference character 46 is formed of a single rectangular piece of metal which in the initial step of manufacture is cut to form parallel slots 47 which are omitted near the center and the material is creased across the central portion connecting the slots by creases 48 along which the metal is turned up in a U shaped cross section somewhat as in the previous instance. Prior to bending, the metal is also creased at 49 and 50 at right angles to the slots 47 and crossing the ends of the same. The portions on the two sides of the slots 47 having been bent up at right angles so that they are parallel each to the other, the end flaps 51 outside of the creases 49 are then bent about said creases so that the flaps 51 radiate from the central portion 52. The tongues 53 from the slots 47 may then be turned up and spot welded to close the ends 54 of the center portion. The partition member 46 is then in the form illustrated in Figure 11 with radial partitions formed by members 51 and parallel partitions formed by the intermediate areas. These parallel partitions 55 serve as supports for the bulbs 56 as in the previous instance and the ends 54 may be used to support the stop and tail light bulbs 57 and 58. Contacts 29, 30, 29', 30' are like those previously described.

The complete rear light box is illustrated in Figure 8, having the stop light above the tail light below and direction arrows oppositely disposed one at each side. Illumination is provided in the direction signals as already described and for the stop and tail lights in the usual manner. This type of box is of particular advantage as original equipment. It costs little more than the usual stop and tail light.

An important feature of the invention resides in the provision of a control box which is formed integrally with the hornbutton 59 as shown in Figures 12, 15 the hornbutton including the controller box being shown in plan in Figure 12. The controller contains a lever switch 60 which projects through a slot 61 and indicators 62, 63, which may be in the form of arrows or other suitable slots or pointers illuminated by indicator lights included in the circuit as shown in Figure 1 or such illumination may be omitted, or the indicators, including the illumination therefor, may be placed on the instrument board on the dash. These indicators, as already pointed out, may consist of red and green, or other suitably contrasting colored lights, 65 and 66. Red and green are preferred as the general familiarity with the significance of these colors due to their long use in maritime practice is helpful.

The circuit diagram illustrated in Figure 1, which is for example only, various types of circuits being available for this purpose, shows a switch which may be used with the various forms of the invention shown. The switch as shown is of the double throw lever type, having a lever 70 which rocks through a neutral point 71 into engagement with the opposite contacts 72, 73, being however, normally on the neutral point.

In Figure 13 I have shown the inside of the cover of the control box as formed in the button. This cover 80 contains the pointer slots 62 and 63, and it carries a partition 81 in which the light bulbs 65, 66 are mounted as in the previous instance. The colors referred to may be due either to the colors of the cover glass 82 formed in one or two pieces as preferred, or to the color of the bulbs. The partition 81 is shown as of T shape and is preferably secured to the cover to be inserted in the chamber 84 when the cover is applied. Thus inserted, it divides the chamber into three compartments 85, 86, 87. Compartments 85 and 86 contain the bulbs 65 and 66, which underlie pointers 62 and 63, and compartment 87 contains a block 88 of insulating material suitably secured preferably to the button proper 89 beneath the cover. This block 88 which is preferably of a phenolic condensation product carries the switch 60 and spring contacts 91 and 92 which operate similarly to those already described. Figure 13 shows a horn button with horn contacts 93 and circuit 94 supported by a spring 95 to operate in accordance with the usual practice. The box is indicated at 96. The signal circuit wiring 9 is passed downwardly through the button shank 99 and through the wheel column 98.

Figure 18 shows a horn button 100 at the center of the wheel as in Figures 12 and 14, and serving as a control box but carrying the switch only. The indicator box 103 is on the dash containing lights 6 and 7 not shown in that figure. This figure includes a diagrammatic showing of a circuit 104 with pointer signal boxes 1 and 2 at the rear and at the front. The front of the vehicle is shown at 105 and the rear with the spare tire, etc. at 106, this portion of the figure being diagrammatic.

Figures 16 and 17 show the control box 3 containing indicator lights 6 and 7 and having indicator pointers 62 and 63 corresponding to the system of Figure 1, these lights 6 and 7 have spring contacts 72' and 73', and bulbs 6 and 7 are mounted on a T shaped partition at 74' which may be like that used in the horn button as already described.

In the operation of the system with the switch lever 70 in the position indicated in contact with terminal 72, the right hand bulbs 19 are illuminated, and the right hand pointers shown in the form of arrows 12 are correspondingly illuminated indicating the intention of the driver to turn to the right. This indication is communicated in accordance with the form shown in Figure 1 to both the rear unit contained in the rear casing 1 and to the front unit contained in the front casing 2, though it should be understood that the signal with its pointers 12 and 14 may be applied at either the front or rear, as well as at both points.

The circuit, as already described, may also include indicating lights 6 and 7, or 65, 66, in circuit, the light 6 with the bulbs 19 which serve to illuminate the right hand arrow, and the indicating light 7 with the bulbs 18 serving to illuminate the left hand pointer or arrow. These indicator lights 6 and 7 serve both to assure the driver that the signalling apparatus is in operative condition or otherwise and to inform him of the fact that one or the other of the right and left hand signals is or is not illuminated. It may be considered helpful to include with these indicating lights which may be red and green or other suitably contrasting colors, arrow indicator slots 62 and 63, corresponding to the pointers 12 and 14 so that the operator may never be in doubt as to the particular direction indicating signal which he has caused or may cause to be illuminated.

The circuit diagram, Figure 1, which as already pointed out, is for example only, also includes a sounding device 8 which is connected in circuit with the respective signal lights 18 and 19 to be energized in correspondence therewith, both as a means for advising the operator that the signaling system is in operative condition and to call the attention of other drivers to the signal. It also serves as a means for calling the attention of the operator to the fact that one or the other signal is illuminated when and if he should overlook this fact and permit the signal to remain illuminated when he has passed the turn as to which he has signalled a warning to other drivers.

The control switch 70 is conveniently placed preferably near the center of the steering wheel and probably to the best advantage in accordance with the present invention it projects from a control casing which is formed integrally with the horn button, the latter being in accordance with the almost universal practice at the center of the steering wheel. This makes it convenient to lead the wires for the signaling system through the tubular column to the signaling units and enables the driver to operate at will the horn and the direction indicator simultaneously, or either separately.

The indicators in the form of small lighting bulbs in circuit with the bulbs which illuminate the right and left pointers 12 and 14, respectively, are exposed in the direct line of vision of the driver preferably in the controller casing at the center of the steering wheel, the small pointers 62, 63 being of particular advantage in advising the driver of the direction of the turn which he has signalled when the switch is operated. These may also be of color similar to the corresponding direction signals.

Figure 11:
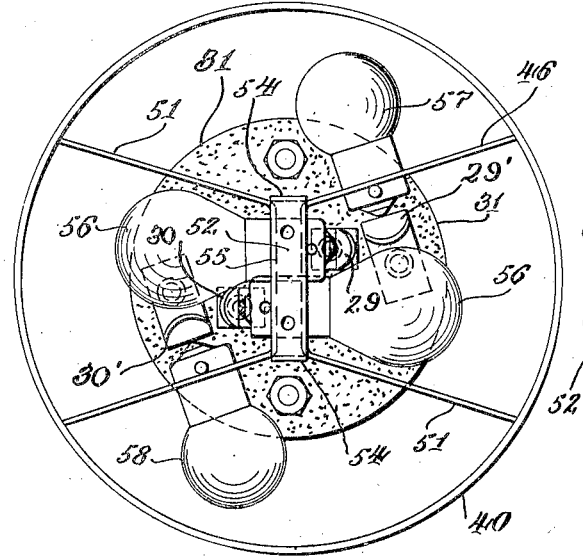
Figure 11 is an elevation of the box as shown in Figure 8, the partition and light support having been separated from the cover by removal of the holding screws and permitted to remain in the cover for purposes of illustration, the cover itself being removed to show the other parts in their normal position within the box.
Figure 10:
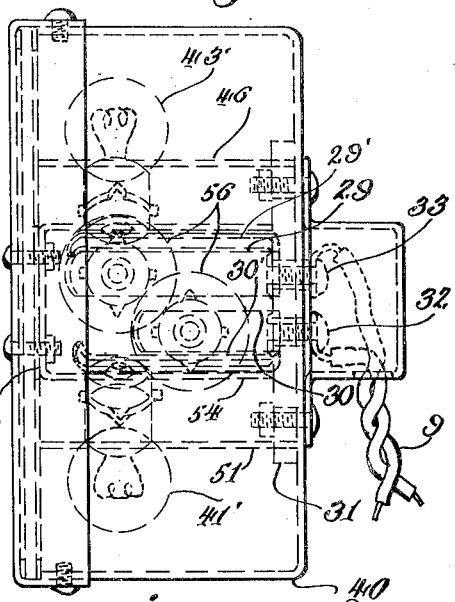
Figure 10 is a side elevation of the box shown in Figure 8.

The illustration includes an alternative form of light box shown in Figures 8 and 11, particularly adapted for installation at the rear of the vehicle as original equipment. This includes in addition to the direction signals, a stop light 43 with its bulb 57 and tail light 44 with its bulb 58 mounted in a single casing or box 40 which takes the place of the present stop and tail light box. This form is best adapted for original equipment, as it costs but little more than the ordinary stop and tail light which it replaces and with the controller located in the horn button it provides for simultaneous operation of the sound signal and direction indicator and occupies no space which is otherwise useful. If preferred, the sounding device indicated at 8 in Figure 1 may be included in either form and located to comply with existing conditions. It has the advantage that it may be placed at the rear in the vicinity of the rear signal light and should be distinguishable from any type of horn used for other warnings.

The new system has the further advantage of the maximum of convenience in that the switch can be operated to indicate the direction of the turn at the instant of sounding the horn and that even when the horn is not to be sounded the location of the switch on the horn button places it at a point where it is easily located by the driver without hesitation due to the familiarity with this location incident to operation of the horn. The placing of the indicator lights on the horn button brings them directly in the line of vision of the driver and with the indicator lights thus located the driver is not apt to forget the signal and leave it on, i. e., leave one or the other points illuminated.

The apparatus as devised is adapted to be manufactured in large quantities and can be produced at such a small cost that the complete equipment can be sold to advantage at a profit to both the manufacturer, distributor and retailer by whom it can be sold as an automobile accessory at a very small price and installed by a man accustomed to this work, in about an hour, and the combined stop, tail and signal light has important advantages as original equipment, as it adds practically nothing to the original cost. The separate unit, Figures 2 and 3, can also be used to advantage for this purpose.

The constructions disclosed are believed to have particular advantages on account of the form and arrangement whereby the device is so simplified that it can be produced in quantity at a minimum of cost, however, the arrangement of the bulb mountings whereby they are supported on the front cover which carries the glass is of advantage not only on the ground of cheapness, but because of the ease and convenience with which the bulbs can be removed and replaced and the contacts cleaned and corrected in case of need, any tendency to failure of the circuit on account of defective contacts at this point being thus easily overcome.

Both structures shown, referring to the box containing the direction signal only and the box containing the direction signal and the stop and tail light, have been simplified, improved and cheapened by the fact that the partitions serve as bulb mounting or socket support and this bulb mounting is utilized as a clamp to hold not only the bulbs but the glass and packing in place and by the fact that the metal contacts are permanently mounted so as to avoid loosening of the connections due to vibrations.

The construction is also of advantage because of the fact that the combined signal light, stop and tail light can be applied to old cars by merely replacing the ordinary stop and tail light or the direction signal boxes may be used without disturbing the original equipment.

The blinker inserted in the circuit whereby the light which illuminates the pointers is interrupted at intervals, serves to attract immediate attention to the signal which in the preferred form in combination with the light signal is also a feature of the system of the invention.

The direction indicator has important advantages in city driving, being of great assistance in reducing confusion incident to the handling of traffic at intersections. The pointers at the front inform traffic officers and pedestrians of the desire or intent of the driver to turn his vehicle in the direction indicated. The sounding device operated with the signal is most effective in obtaining the attention of pedestrians, when a line of this kind of traffic is to be crossed in turning and the combination of the direction signal with the horn button is of great assistance when additional emphasis is necessary.

I have thus described specifically and in detail a direction signal system embodying the features of the invention in the preferred form in order that the manner of constructing, applying, operating and using the same may be fully understood, however, the specific terms herein are used descriptively rather than in a limiting sense, the scope of the invention being defined in the claims.

What I claim as new and desire to secure by Letters Patent is:

1. A signal system for motor vehicles comprising the combination of an electric sounding device, oppositely disposed direction indicators exposed to the observation of traffic approaching from the front and rear, separate electric illuminating means for lighting the indicators, a periodically operating interrupter and a switch for selectively illuminating the indicators at the will of the operator, the sounding device and the interruper being in circuit with each said illuminating means so that the lights and the sounding device are operated and interrupted in conjunction with each other and simultaneously calling the attention of traffic officers and pedestrians to the fact that a change of direction is contemplated.

2. The combination in a direction signaling device for motor vehicles of oppositely disposed right and left pointers exposed to approaching traffic at the front and rear, light sources for separately illuminating each pointer, an electric sounding device for calling attention to the signals, right and left indicators adjacent and conspicuously exposed to the driver, light sources for separately illuminating the indicators, an interrupter, a source of electricity and a circuit with switch means for illuminating either the right hand pointer and the right hand indicator or the left hand pointer and the left hand indicator simultaneously at the will of the operator, the sounding device and interrupter being in circuit with the sources of illumination either pointer and the corresponding indicator being illuminated and the sounding device being operated and interrupted simultaneously with each other giving the effect of a blinking pointer, a blinking indicator and an intermittent sound to call the attention of both the driver and the traffic to the fact that the signal is in operation and to the direction of the proposed turn indicated thereby.

3. The combination in a direction signaling device for motor vehicles of oppositely disposed right and left pointers exposed to traffic approaching substantially in the line of the motion of the vehicle, light sources for separately illuminating each pointer, an electric sounding device, right and left indicators adjacent and conspicuously exposed to the driver, light sources for separately illuminating each indicator, a circuit interrupter, a source of electricity and a circuit with switch means for illuminating either the right hand pointer and the right hand indicator or the left hand pointer and the left hand indicator simultaneously at the will of the operator, the sounding device and interrupter being in circuit with the sources of illumination, either pointer and the corresponding indicator being illuminated and interrupted and the sounding device being operated and interrupted simultaneously with each other giving the effect of a blinking pointer, a blinking indicator and an intermittent sound to call the attention of both the driver and the traffic to the fact that the signal is in operation and the direction indicated thereby.

4. A signal system for motor vehicles comprising in combination a source of electric current, an electric sounding device, electrically actuated right and left direction indicators susceptible to visually intermittent actuation and adapted to display direction signals to traffic approaching the front and rear of the vehicle, an electric circuit interrupter, means for connecting said sounding device, said interrupter and said right or left indicators in circuit with said source of electric current so that a selected interrupted display signal and the sounding device are operated in conjunction with each other to effect a plural warning.

HAROLD O. SMITH.